US012660802B2

(12) United States Patent
     Liang

(10) Patent No.: US 12,660,802 B2
(45) Date of Patent: Jun. 23, 2026

(54) EGG COLLECTING CHICKEN NEST DEVICE WITH CUSHION BODY

(71) Applicant: Zhuanyun Liang, Jiangmen (CN)

(72) Inventor: Zhuanyun Liang, Jiangmen (CN)

( * ) Notice: Subject to any disclaimer, the term of this patent is extended or adjusted under 35 U.S.C. 154(b) by 0 days.

(21) Appl. No.: 19/377,444

(22) Filed: Nov. 3, 2025

(65) Prior Publication Data

US 2026/0083101 A1     Mar. 26, 2026

(30) Foreign Application Priority Data

Sep. 25, 2024    (CN) .......................... 202422353245.4

(51) Int. Cl.
     *A01K 31/16*          (2006.01)
(52) U.S. Cl.
     CPC .................................. *A01K 31/165* (2013.01)
(58) Field of Classification Search
     CPC ...... A01K 31/165; A01K 31/16; A01K 31/17;
                                              A01K 31/14
     See application file for complete search history.

(56) References Cited

U.S. PATENT DOCUMENTS

| | | | | | |
|---|---|---|---|---|---|
| 679,323 | A | * | 7/1901 | Morin ..................... | A01K 31/16 |
| | | | | | 119/334 |
| 867,348 | A | * | 10/1907 | Crosley .................. | A01K 31/16 |
| | | | | | 119/343 |
| 879,990 | A | * | 2/1908 | Warner, Jr. ............ | A01K 31/16 |
| | | | | | 119/332 |

| | | | | | |
|---|---|---|---|---|---|
| 886,151 | A | * | 4/1908 | Olson ..................... | A01K 31/16 |
| | | | | | 119/334 |
| 935,084 | A | * | 9/1909 | Ault ....................... | A01K 31/16 |
| | | | | | 119/345 |
| 1,881,122 | A | * | 10/1932 | Forney ................... | A01K 31/16 |
| | | | | | 119/334 |
| 2,692,578 | A | * | 10/1954 | Manning ................ | A01K 31/16 |
| | | | | | 62/381 |
| 3,139,065 | A | * | 6/1964 | Willauer, Jr. .......... | A01K 31/16 |
| | | | | | 119/337 |
| 3,242,904 | A | * | 3/1966 | Rannou ................ | A01K 31/007 |
| | | | | | 119/347 |

(Continued)

FOREIGN PATENT DOCUMENTS

| | | | | | |
|---|---|---|---|---|---|
| CN | 110402844 | A | * 11/2019 | .......... | A01K 31/165 |
| CN | 113837329 | A | * 12/2021 | ............. | A01K 31/16 |

*Primary Examiner* — Monica L Perry
(74) *Attorney, Agent, or Firm* — JEEN IP LAW, LLC

(57) ABSTRACT

An egg collecting egg collecting chicken nest device with a cushion body is provided, which includes a chicken nest shell having a first accommodation chamber and a first conveying port connected to the first accommodation chamber; an egg collecting shell having a second accommodation chamber and a second conveying port connected to the second accommodation chamber. The egg collecting shell is connected to the chicken nest shell, and the first conveying port is connected to the second conveying port. The chicken is placed into the first accommodation chamber of the chicken nest shell, and when the chicken lays eggs in the first accommodation chamber, the eggs can roll directly into the second accommodation chamber through the first and second conveying ports, reducing the time and labor intensity of manual egg collection and improving the efficiency of egg transportation and collection, making it very suitable for daily household users.

8 Claims, 4 Drawing Sheets

(56)                    References Cited

U.S. PATENT DOCUMENTS

| | | | |
|---|---|---|---|
| 4,188,911 A * | 2/1980 | Rafaely .................. | A01K 31/16 |
| | | | 119/329 |
| 5,125,362 A * | 6/1992 | Erickson ................ | A01K 31/16 |
| | | | 119/329 |
| 10,980,219 B2 * | 4/2021 | Volin ..................... | A01K 31/18 |
| 2020/0015458 A1 * | 1/2020 | Cervera Soto ....... | A01K 31/165 |

* cited by examiner

EGG COLLECTING CHICKEN NEST DEVICE WITH CUSHION BODY

CROSS-REFERENCE TO RELATED APPLICATIONS

This application claims priority to Chinese Patent Application No. 202422353245.4, filed on Sep. 25, 2024, which is hereby incorporated by reference in its entirety.

TECHNICAL FIELD

The present disclosure relates to the field of breeding equipment technologies, and in particular, to an egg collecting chicken nest device with a cushion body.

BACKGROUND

In modern animal farming, the collection and management of eggs is an important aspect. The traditional manual collection of eggs is not only time-consuming and labor-intensive, but also prone to damage and contamination of the eggs.

However, most of the existing egg collection boxes use inclined plates or conduits to export the eggs laid in the chicken nest to the egg collection box, which is suitable for large/medium/large chicken nests. This not only occupies a large area but also has low collection efficiency, making it unsuitable for daily household use.

SUMMARY

In order to overcome the shortcomings of existing technology, the present disclosure provides an egg collecting chicken nest device with a cushion body, which has a simple structure, increased efficiency in transporting eggs, small footprint, and is convenient for household users to use.

The technical solution adopted by the present disclosure to address its technical problem is as follows.

The present disclosure provides an egg collecting chicken nest device with a cushion body, including:

a chicken nest shell, which includes a first accommodation chamber and a first conveying port connected to the first accommodation chamber; and an egg collecting shell, which includes a second accommodation chamber and a second conveying port connected to the second accommodation chamber; the egg collecting shell is connected to the chicken nest shell, and the first conveying port is connected to the second conveying port.

In some embodiments of the present disclosure, the egg collecting chicken nest device further includes at least one support member, and the support member is connected to the chicken nest shell to tilt the chicken nest shell towards the egg collecting shell.

In some embodiments of the present disclosure, the first accommodation chamber has a first bottom, and the second accommodation chamber has a second bottom, a horizontal height of the first bottom is greater than that of the second bottom.

In some embodiments of the present disclosure, the support member is provided with a plurality of limit clamp slots, and the limit clamp slots are longitudinally distributed on the support member; the limit clamp buckles cooperate with the limit clamp slots to adjust an inclination angle of the chicken nest shell.

In some embodiments of the present disclosure, the chicken nest shell is provided with a first opening that is connected to the first accommodation chamber and is arranged facing the first bottom; the first accommodation chamber has a side wall that is connected between the first bottom and the first opening and is arranged around first accommodation chamber; a width of the side wall gradually increases along the first bottom towards the first opening.

In some embodiments of the present disclosure, the chicken nest shell and the egg collecting shell are detachably connected through a connecting device.

In some embodiments of the present disclosure, the connection device includes a connecting buckle provided on the chicken nest shell and a connecting clamp groove provided on the egg collecting shell, and the connecting buckle cooperates with the connecting clamp groove to clamp, so that the chicken nest shell and the egg collecting shell are detachably connected.

In some embodiments of the present disclosure, the egg collecting chicken nest device further includes a chicken nest cushion body, and the chicken nest cushion body is detachably connected to the first bottom.

In some embodiments of the present disclosure, the chicken nest cushion body is a flexible chicken nest cushion body, the first bottom is provided with a clamping buckle, the chicken nest cushion body is provided with a clamping hole, and the clamping buckle is configured to pass through the clamping hole and fix the chicken nest cushion body to cover the first bottom.

In some embodiments of the present disclosure, a height of the second bottom gradually decreases from a middle towards left and right ends; the chicken nest shell has a conveying channel, and the conveying channel is connected between the first accommodation chamber and the first conveying port; a width of the conveying channel gradually increases from the first accommodation chamber towards the first conveying port to form a trumpet shaped conveying channel.

In some embodiments of the present disclosure, the egg collecting shell is rotatably connected to a flip cover, and the flip cover is hinged to an upper end of the egg collecting shell, and the flip cover at least partially covers an upper part of the second accommodation chamber.

The beneficial effects of the present disclosure are: the present disclosure provides an egg collecting chicken nest device with a cushion body, which includes the chicken nest shell having a first accommodation chamber and a first conveying port connected to the first accommodation chamber; the egg collecting shell having a second accommodation chamber and a second conveying port connected to the second accommodation chamber. The egg collecting shell is connected to the chicken nest shell, and the first conveying port is connected to the second conveying port. Chicken is placed into the first accommodation chamber of the chicken nest shell, and when the chicken lays eggs in the first accommodation chamber, the eggs can roll directly into the second accommodation chamber through the first and second conveying ports, reducing the time and labor intensity of manual egg collection and improving the efficiency of egg transportation and collection. Due to the ability to quickly transport eggs from the chicken nest shell to the egg collecting shell, collisions and squeezing of eggs inside the chicken nest shell are avoided, thereby reducing the risk of egg damage. The structure is simple, the transportation is efficient, and the footprint is small, making it very suitable for daily household users.

BRIEF DESCRIPTION OF DRAWINGS

In order to provide a clearer explanation of the technical solution in the embodiments of the present disclosure, a brief introduction will be given to the drawings required for the description of the embodiments. The drawings described below are only some embodiments of the present disclosure. For those skilled in the art, other drawings can be obtained based on these drawings without creative work.

The following will further explain the present disclosure in combination with the accompanying drawings and embodiments.

DESCRIPTION OF EMBODIMENTS

Figure 1:
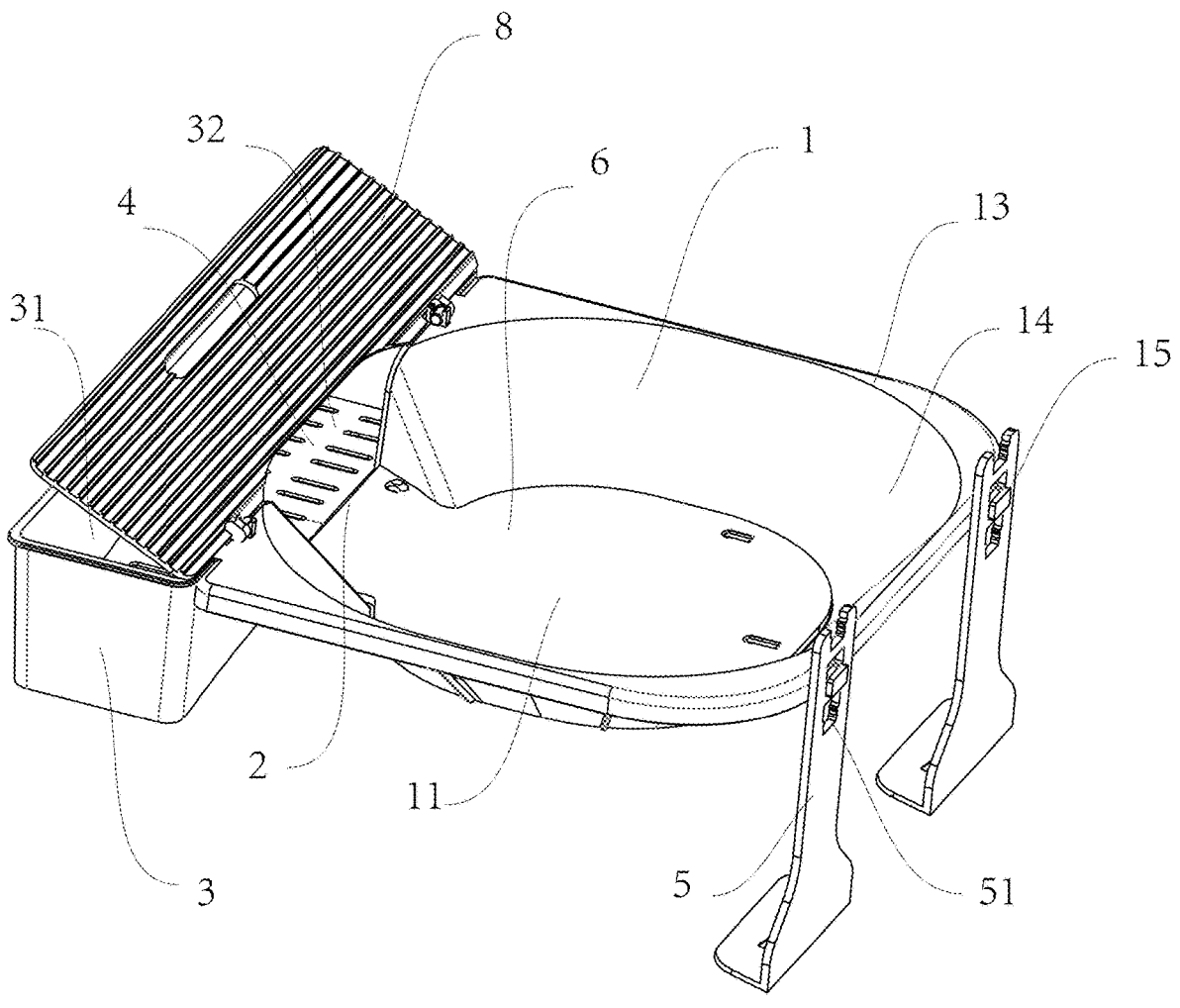
FIG. 1 is a schematic diagram of an overall structure of the present disclosure.
Figure 2:
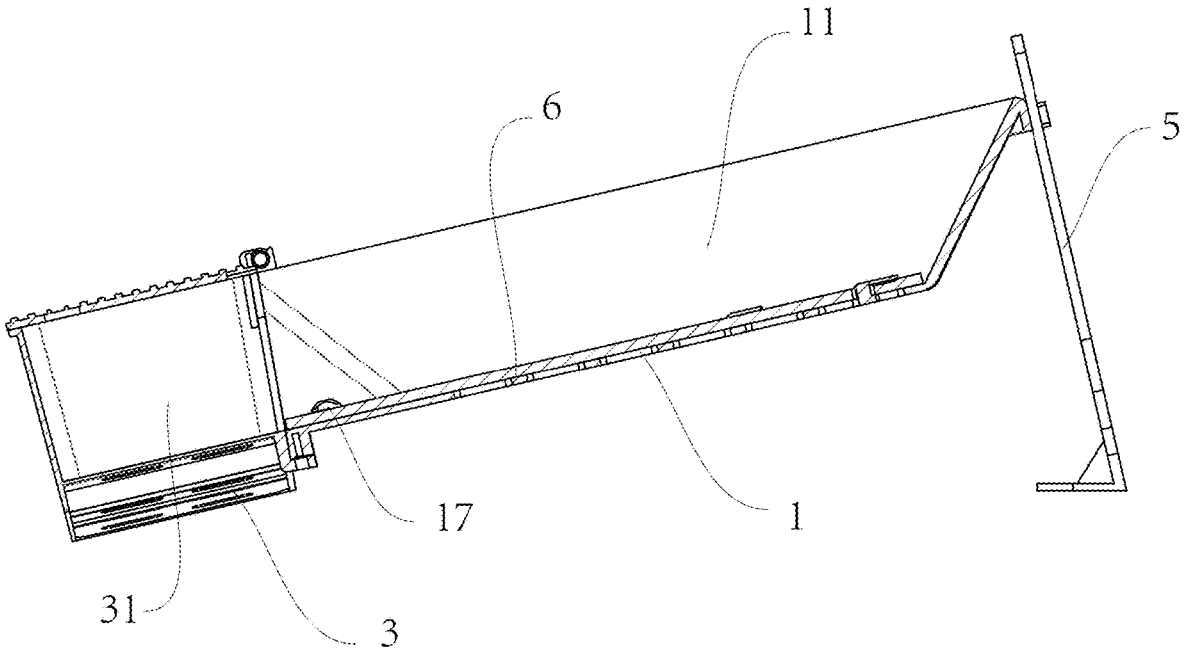
FIG. 2 is a sectional view of the present disclosure.
Figure 3:
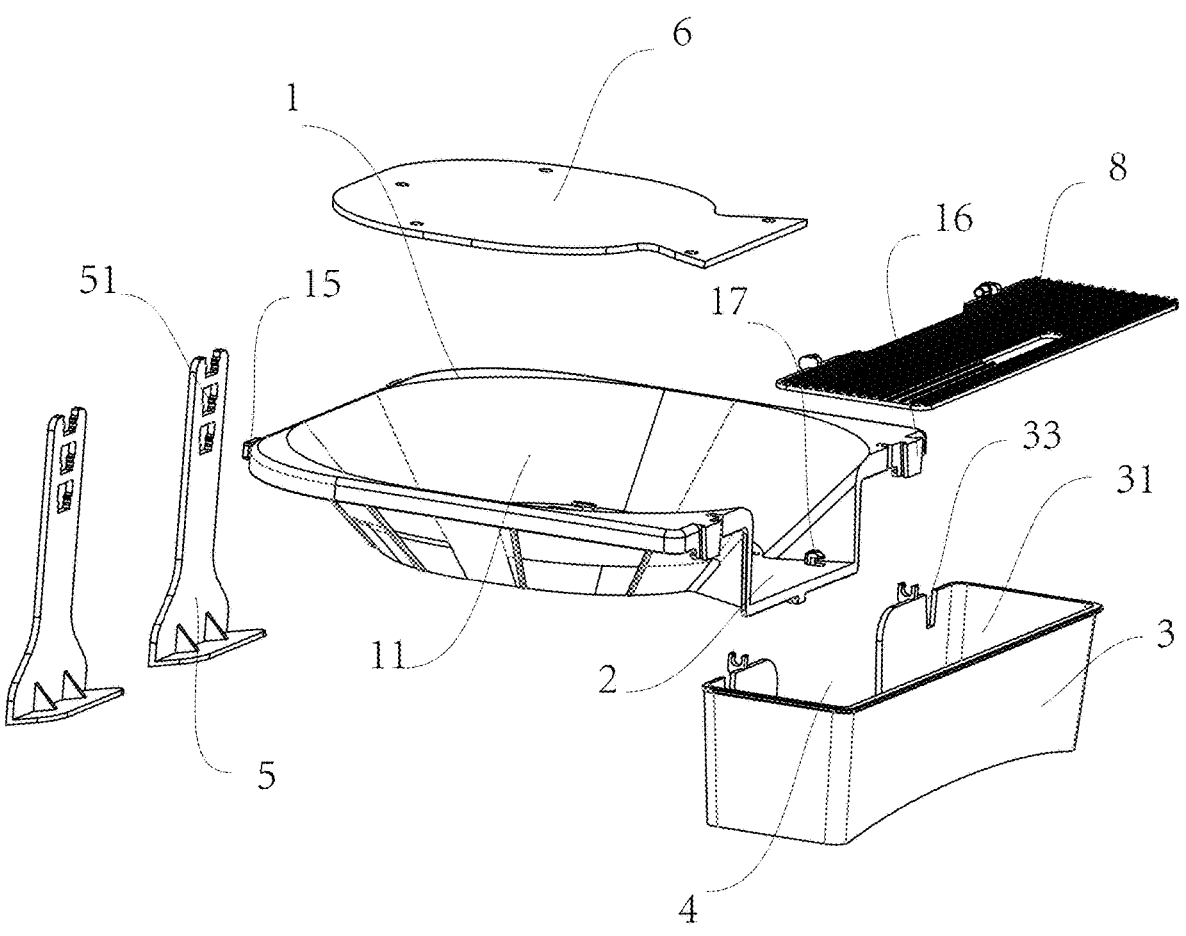
FIG. 3 is an exploded view of the present disclosure.
Figure 4:
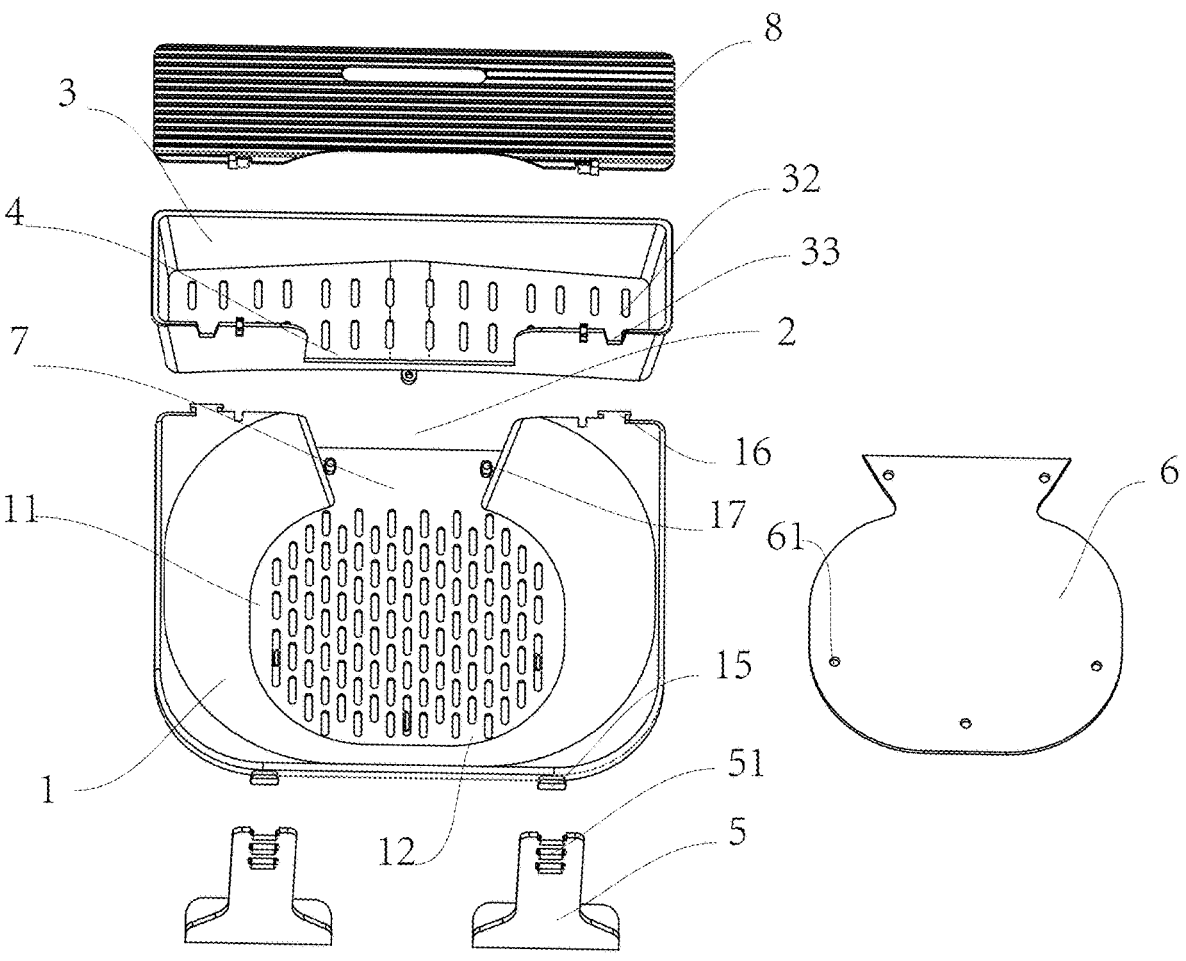
FIG. 4 is an exploded view from another perspective of the present disclosure.

Referring to FIGS. 1 to 4, an egg collecting chicken nest device with a cushion body, including:

a chicken nest shell 1, which has a first accommodation chamber 11 and a first conveying port 2 connected to the first accommodation chamber 11; and an egg collecting shell 3, which has a second accommodation chamber 31 and a second conveying port 4 connected to the second accommodation chamber 31; the egg collecting shell 3 is connected to the chicken nest shell 1, and the first conveying port 2 is connected to the second conveying port 4.

Through the above structure, chicken is placed into the first accommodation chamber 11 of the chicken nest shell 1. When the chicken lays eggs in the first accommodation chamber 11, the eggs can be directly rolled into the second accommodation chamber 31 through the first conveying port 2 and the second conveying port 4, reducing the time and labor intensity of manual egg collection and improving the efficiency of egg transportation and collection. Due to the ability of eggs to be quickly transported from the chicken nest shell 1 to the egg collecting shell 3, collision and squeezing of eggs inside the chicken nest shell 1 are avoided, thereby reducing the risk of egg damage. The structure is simple, the transportation is efficient, and the footprint is small, making it very suitable for daily household users.

In this embodiment, the egg collecting chicken nest device further includes at least one support member 5, and the support member 5 is connected to the chicken nest shell 1 to tilt the chicken nest shell 1 towards the egg collecting shell 3. In an implementation mode, the support member 5 is supported on one side of the chicken nest shell 1 away from the egg collecting shell 3. Through the above structure, under the support of the support member 5, the side of the chicken nest shell 1 away from the egg collecting shell 3 is raised, causing the chicken nest shell 1 to tilt towards the egg collecting shell 3. When the chicken lays eggs in the chicken nest shell 1, the eggs naturally roll into the egg collecting shell 3 under the action of gravity, thereby effectively achieving rapid collection of eggs.

In this embodiment, the first accommodation chamber 11 has a first bottom 12, and the second accommodation chamber 31 has a second bottom 32. A horizontal height of the first bottom 12 is greater than that of the second bottom 32. Through the above structure, since the horizontal height of the first bottom 12 is greater than that of the second bottom 32, eggs can roll more smoothly from the chicken nest shell 1 to the egg collecting shell 3.

In this embodiment, the support member 5 is provided with a plurality of limit clamp slots 51, and the limit clamp slots 51 are longitudinally distributed on the support member 5. The chicken nest shell 1 is provided with limit clamp buckles 15, and the limit clamp buckles 15 cooperate with the limit clamp slots 51 to adjust an inclination angle of the chicken nest shell 1. In an implementation mode, the support member 5 is provided with three limit clamp slots 51, and there are two support members 5. The chicken nest shell 1 is provided with two limit clamp buckles 15, and the two limit clamp buckles 15 are symmetrically arranged at two ends of the chicken nest shell 1 away from the egg collecting shell 3. Through the above structure, due to the longitudinal distribution of the limit clamp slots 51 on the support members 5, when adjusting the fit between the limit clamp buckles 15 and the limit clamp slots 51, the inclination angle of the chicken nest shell 1 also changes accordingly. The higher the fit with the limit clamp slots 51, the higher the inclination angle of the chicken nest shell 1, and the faster the egg rolls off.

In this embodiment, the chicken nest shell 1 is provided with a first opening 13 connected to the first accommodation chamber 11 and arranged facing the first bottom 12. The first accommodation chamber 11 has a side wall 14 connected between the first bottom 12 and the first opening 13 and arranged around the first accommodation chamber 11. A relative width of the side wall 14 gradually increases along the first bottom 12 towards the first opening 13. Where the first bottom 12 is in the shape of a rounded rectangle. Through the above structure, the chicken nest shell 1 is formed with a funnel-shaped first accommodation chamber 11, which has a beautiful and practical appearance.

In this embodiment, the chicken nest shell 1 and the egg collecting shell 3 are detachably connected through a connecting device.

In an implementation mode, the connecting device includes a connecting buckle 16 provided on the chicken nest shell 1 and a connecting clamp groove 33 provided on the egg collecting shell 3. The connecting buckle 16 is engaged with the connecting clamp groove 33 to allow for a detachable connection between the chicken nest shell 1 and the egg collecting shell 3. In an implementation mode, there are two connecting buckles 16 and two connecting clamp grooves 33. The connecting buckles 16 protrude from one side of the chicken nest shell 1. Through the above structure, the chicken nest shell 1 can be sleeved and clamped on the connecting clamp grooves 33 of the egg collecting shell 3 by the connecting buckles 16. The operation is simple, fast, and easy to install and disassemble.

In this embodiment, the egg collecting chicken nest device further includes a chicken nest cushion body 6, and the chicken nest cushion body 6 can be detachably connected to the first bottom 12. In an implementation mode, the chicken nest cushion body 6 is made of jute fiber. And the shape of the chicken nest cushion body 6 matches the shape of the first bottom 12 and can be adjusted accordingly based on the size of the first bottom 12.

In an implementation mode, the chicken nest cushion body 6 is a flexible chicken nest cushion body 6, and the first bottom 12 is provided with a clamping buckle 17. The chicken nest cushion body 6 is provided with a clamping hole 61, and the clamping buckle 17 can pass through the clamping hole 61 and fix the chicken nest cushion body 6 to cover the first bottom 12. Through the above structure, the flexible chicken nest cushion body 6 can provide a more comfortable environment, making chickens more willing to lay eggs in the chicken nest shell 1. The jute fiber chicken nest cushion body 6 has good breathability, which can help regulate the humidity and temperature of the chicken nest shell 1, keep the environment dry, and improve the comfort of the chicken nest shell 1.

In this embodiment, a height of the second bottom 32 gradually decreases from a middle towards left and right ends. Through the above structure, the bottom of the egg collecting shell 3 forms a shape with a high center and low ends, avoiding the phenomenon of egg accumulation when entering from the middle.

In this embodiment, the chicken nest shell 1 has a conveying channel 7 connected between the first accommodation chamber 11 and the first conveying port 2. A relative width of the conveying channel 7 gradually increases from the first accommodation chamber 11 towards the first conveying port 2 to form a trumpet shaped conveying channel 7. Through the above structure, produced eggs roll from the conveying channel 7 into the egg collecting shell 3, and the horn shaped conveying channel 7 increases the space for the eggs to roll down, avoiding the phenomenon of automatic stacking when there are too many eggs.

In this embodiment, the egg collecting shell 3 is rotatably connected to a flip cover 8, and the flip cover 8 is hinged to an upper end of the egg collecting shell 3. The flip cover 8 at least partially covers an upper part of the second accommodation chamber 31. In an implementation mode, the flip cover 8 covers the upper part of the second accommodation chamber 31 completely. Through the above structure, the flip cover 8 is used to protect the eggs, prevent them from being crushed by the hen's trampling, and facilitate users to open a lid and take out the eggs.

The above is one or more embodiments provided in combination with specific content, and it is not assumed that the specific implementation of the present disclosure is limited to these explanations. Any similarity or similarity with the method, structure, etc. of the present disclosure, or any technical deduction or substitution made under the premise of the concept of the present disclosure, shall be deemed as the protection scope of the present disclosure.

What is claimed is:

1. An egg collecting chicken nest device with a cushion body, comprising:
   a chicken nest shell, which comprises a first accommodation chamber and a first conveying port connected to the first accommodation chamber;
   an egg collecting shell, which comprises a second accommodation chamber and a second conveying port connected to the second accommodation chamber,
   wherein the egg collecting shell is connected to the chicken nest shell, and the first conveying port is connected to the second conveying port;
   at least one support member, and the support member is connected to the chicken nest shell so as to tilt the chicken nest shell towards the egg collecting shell;
   the first accommodation chamber has a first bottom, and the second accommodation chamber has a second bottom, wherein a horizontal height of the first bottom is greater than that of the second bottom; and
   a chicken nest cushion body, wherein the chicken nest cushion body is detachably connected to the first bottom.

2. The egg collecting chicken nest device with a cushion body according to claim 1, wherein the chicken nest shell is provided with a first opening connected to the first accommodation chamber and arranged facing the first bottom; the first accommodation chamber has a side wall connected between the first bottom and the first opening and arranged around the first accommodation chamber; a width of the side wall gradually increases along the first bottom towards the first opening.

3. The egg collecting chicken nest device with a cushion body according to claim 1, wherein the support member is provided with a plurality of limit clamp slots, and the limit clamp slots are longitudinally distributed on the support member; the chicken nest shell is provided with limit clamp buckles, and the limit clamp buckles cooperate with the limit clamp slots to adjust an inclination angle of the chicken nest shell.

4. The egg collecting chicken nest device with a cushion body according to claim 1, wherein the chicken nest shell and the egg collecting shell are detachable connected by a connecting device.

5. The egg collecting chicken nest device with a cushion body according to claim 4, wherein the connecting device comprises a connecting buckle provided on the chicken nest shell and a connecting clamp groove provided on the egg collecting shell, and the connecting buckle cooperates with the connecting clamp groove to clamp in attachment, such that the chicken nest shell and the egg collecting shell are detachably connected.

6. The egg collecting chicken nest device with a cushion body according to claim 1, wherein the chicken nest cushion body is a flexible chicken nest cushion body, the first bottom is provided with a clamping buckle, the chicken nest cushion body is provided with a clamping hole, and the clamping buckle is configured to pass through the clamping hole and fix the chicken nest cushion body to cover the first bottom.

7. The egg collecting chicken nest device with a cushion body according to claim 1, wherein a height of the second bottom gradually decreases from a middle towards left and right ends; the chicken nest shell has a conveying channel, and the conveying channel is connected between the first accommodation chamber and the first conveying port; a width of the conveying channel gradually increases from the first accommodation chamber towards the first conveying port to form a trumpet shaped conveying channel.

8. The egg collecting chicken nest device with a cushion body according to claim 1, wherein the egg collecting shell comprises a rotatably connected flip cover, and the flip cover is hinged to an upper end of the egg collecting shell, and the flip cover at least partially covers an upper part of the second accommodation chamber.

\* \* \* \* \*